United States Patent [19]

Bederman

[11] Patent Number: 4,566,097
[45] Date of Patent: Jan. 21, 1986

[54] TOKEN RING WITH SECONDARY TRANSMIT OPPORTUNITIES

[75] Inventor: Seymour Bederman, Raleigh, N.C.

[73] Assignee: International Business Machines Corp., Armonk, N.Y.

[21] Appl. No.: 565,244

[22] Filed: Dec. 23, 1983

[51] Int. Cl.$^4$ .............................. H04J 3/16; H04J 3/00
[52] U.S. Cl. ......................................... 370/89; 370/86; 370/90; 340/825.5
[58] Field of Search ....................... 370/89, 90, 85, 86; 340/825.5, 825.05

[56] References Cited

U.S. PATENT DOCUMENTS

| | | | |
|---|---|---|---|
| 3,863,220 | 1/1975 | Osawa et al. | 370/89 |
| 4,295,122 | 10/1981 | Hatada et al. | 340/825.5 |
| 4,335,426 | 6/1982 | Maxwell et al. | 340/825.05 |
| 4,373,183 | 2/1983 | Means et al. | 340/825.5 |

FOREIGN PATENT DOCUMENTS 5273604  12/1975  Japan ...................................... 370/89

OTHER PUBLICATIONS

Julius-burger, "Multi-Peer Access Loop Communication System," 3/80.
Bux et al., "A Reliable Token-Ring for Local-Area Communication," 1981.

Primary Examiner—Douglas W. Olms
Assistant Examiner—Curtis Kuntz
Attorney, Agent, or Firm—Joscelyn G. Cockburn

[57] ABSTRACT

Stations on a token ring network use a "Secondary Transmit Opportunity" protocol to transmit information onto the ring. According to the protocol a ring station detecting an idle character immediately following an abort sequence or a physical trailer sequence on the ring may insert a message. Simultaneously, the ring station monitors an input bit stream to detect messages and tokens from upstream stations. If this condition is detected, the station aborts or continues transmission in accordance with a predefined message priority algorithm.

12 Claims, 14 Drawing Figures

FRAME FORMAT

FORMAT OF START OF FRAME SEQUENCE

FORMAT OF ABORT SEQUENCE

FORMAT OF FREE TOKEN SEQUENCE

FORMAT OF SECONDARY TRANSMIT
OPPORTUNITY SEQUENCE

| INPUT DIFFERENTIAL MANCHESTER BAUD SEQUENCE | | OUTPUT TRANSITIONAL CODE |
|---|---|---|
| 0 | 0 | 1 |
| 1 | 1 | 1 |
| 0 | 1 | 0 |
| 1 | 0 | 0 |

TOKEN RING WITH SECONDARY TRANSMIT OPPORTUNITIES

BACKGROUND OF THE INVENTION (a) Field of the Invention

The present invention relates to communication networks in general and more particularly to protocols for inserting data onto the networks.

(b) Prior Art

The use of serial or ring communication networks for transferring data is well known in the prior art. Such networks consist of a set of stations serially connected to a communication medium. Information is transferred sequentially, bit by bit, from one station to the next. The inactive stations are bypassed while the active stations regenerate and repeat each bit. Furthermore, the stations are used as the means for attaching one or more devices (terminals, work station, computers, display, etc.) for communicating with other devices on the network.

An originating station transfers its information (message) onto the ring. The message circulates, passes one or more intermediate stations, until it arrives at the destination station where it is copied. The message remains on the ring until it arrives at the originating station where it is stripped from the ring. In some configurations, part of the stripping of messages is done by a monitor station. In addition, the monitor station may perform other types of housekeeping functions for the ring.

An access method protocol is a necessary element for the above-described ring network. The protocols are the mechanisms which enable a station to transmit on the ring. Stated another way, an access protocol gives a station the right to place its messages for transmission on the ring.

The prior art uses several different types of access method protocols. The so-called "register" insert access protocol and "token" insert access protocols are representative of the prior art. With the register insert access protocol a station seizes the opportunity to transmit whenever there is an "idle" signal on the ring. With the token insert access protocol a station has an opportunity to transmit whenever it receives a free token. The free token is usually generated by an upstream station Although the prior art access method protocols work well for the intended purpose, they are plagued by certain defects which tend to reduce the overall efficiency of the ring networks. The register insert protocols require the introduction of relatively long delays in the ring in order that messages can be successfully stripped from the ring. The delay lengthens the time that is needed to process a message. Likewise, the "token" access protocol allows only one message to be on the ring at any particular instant of time. When the messages are relatively short, compared to the latency of the ring, only a fraction of the available bandwidth is used. Failure to use all of the available bandwidth reduces the efficiency of the ring because a series of idle patterns must be transmitted to fill up the vacancy on the ring.

SUMMARY OF THE INVENTION

It is a general object of the present invention to provide a novel access method protocol which is more efficient than has heretofore been possible.

It is a more specific object of the present invention to provide an access method protocol that allows multiple messages to be placed on a ring network, while maintaining the capability to allow reservations to be made based on priority.

It is another object of the present invention to provide a protocol which enables messages to circulate in a head-tail configuration on a ring communication network.

The protocol is called the "Secondary Transmit Opportunity" (STO). It includes a 24 bit pattern formed by the last two octets of a message or frame followed by 8 bits of "IDLE" pattern. Once an STO pattern is observed on the ring, the observing station that is ready to send a buffered message begins to send by overwriting the idle pattern with a two (2)-octet field comprising of a start delimiter followed by a PCF-0 octet. Preferably, the three priority bits of the PCF-0 octet are encoded with a lowest priority code value. The TI bit is set to "1" and the remaining bits of the PCF-0 octet are set to zeros. Following the transmission of the two octet field, the station begins to transmit the buffered message.

During transmission of the buffered message, the station monitors the upstream ring segment for incoming messages and/or incoming token. If a token sequence is detected, the station checks the priority of the token. If the priority of the token is less than or equal to the priority of the stored message, then the station continues its transmission until the message is completed. If the token has a higher priority than the stored message, then the transmission of the stored message is aborted and the received token is sent. If a start of frame sequence is detected (the TI bit of the PCF-0 octet is set to 1), then the station aborts the transmission of the buffered message, and forwards the message that was received from the upstream ring segment.

The foregoing features and advantages of the invention will be more fully described in the accompanying drawings.

DESCRIPTION OF THE PREFERRED EMBODIMENT

Figure 1:
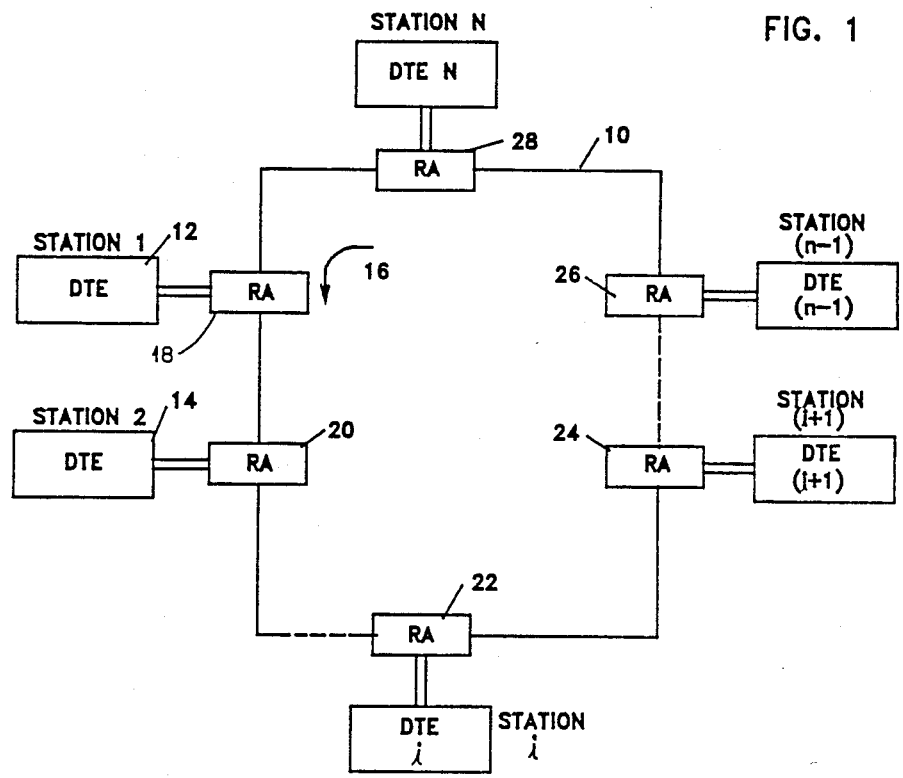
FIG. 1 shows a block diagram of a ring communication network in which the present invention may be used.

FIG. 1 shows a serial loop communication system in which the secondary transmit opportunity (STO) protocol of the present invention may be employed. The serial ring communication system includes a closed loop unidirectional transmission medium identified by numeral 10. The ring interconnects a plurality of data terminal equipment (DTE) or data terminal units (DTUs) 12, 14 . . . i, i+1, . . . n−1 and n. Each data terminal unit may include one or several devices such as display terminals, microcomputers, data collectors, word processing units, telephone type apparatus, etc. The function of the system is to exchange or distribute data between these devices. Data transmission, in the system, is unidirectional and may be shown in the direction of arrow 16. The data terminal equipment is connected to the ring by ring adapter 18, 20, 22, 24, 26 and 28, respectively. The structure and function of the ring adapters are identical. Their purpose is to receive data from and transmit data onto the ring. To this end the ring adapter performs ring protocol functions which enable the free movement of data onto the ring without impacting the design of the data terminal equipment.

Each ring adapter and its connected data terminal equipment are hereinafter referred to as a station. For example, station 1 includes data terminal equipment 12 and ring attachment 18. Likewise, station 2 includes data terminal equipment 14 and ring adapter 20 and so forth. In addition, the communication system is reconfigurable in that if a station is down it does not bring the entire system to a halt. The system is reconfigured so that it bypasses the defective station and/or the defective ring segment (in the event that there is a break in the communication medium) and the functional stations still have the opportunity of operating. A more detailed description of the serial data communication system of FIG. 1 for illustrating the environment in which the invention may be practiced can be found in a copending patent application filed by P. A. Janson et al, titled "Method of Transmitting Information between Stations Attached to a Unidirectional Transmission Ring," Ser. No. 06/326,291, and assigned to the same assignee as this application. The Janson et al application is incorporated herein by reference.

Figure 2:
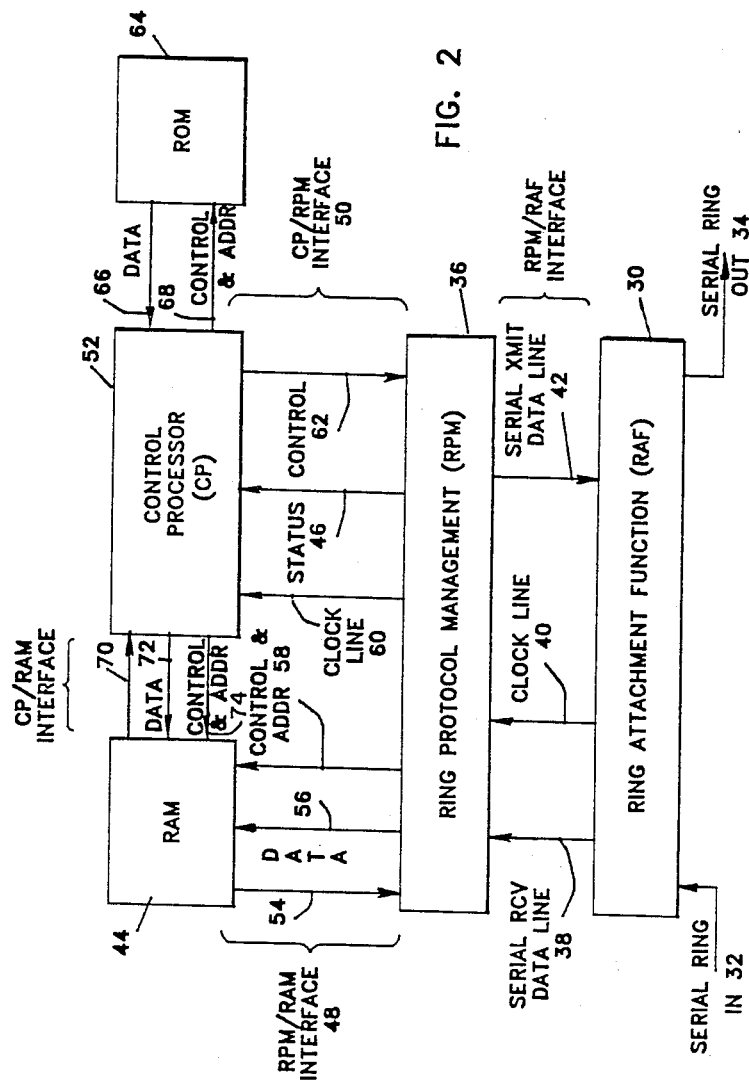
FIG. 2 shows a functional block diagram of a ring adapter.

FIG. 2 shows a functional block diagram of the ring adapter. As stated before, the ring adapter allows a station to accept and dispatch messages on the communication medium of FIG. 1. In order to give each station access to transmit or dispatch data onto the ring, a ring protocol management 36 (FIG. 2) provides access method protocols which give a station the right to transmit when that station is in command of the protocol. One type of access protocol is the above described token protocol. This protocol is described in the "IEEE Project 802 Local Network Standards," Draft C, May 17, 1982 (Section V).

The present invention provides another protocol called the Secondary Transmit Opportunity (STO) protocol. Preferably, this protocol should be used in conjunction with the "token" access protocol. Since the access token protocol is fully described in the referenced working paper, which is incorporated herein by reference, only the portion of that protocol which is necessary to the understanding of the present invention will be described hereinafter.

As will be explained in more detail hereinafter, the ring protocol management 36 (FIG. 2) includes a generator which generates the Secondary Transmit Opportunity Protocol or sequence of bits and places the same on the transmission medium. The stations which are connected to the ring monitor the ring and once a station that is prepared to send a message detects the STO sequence it sends a start of frame sequence and then transmits the contents of its message buffer onto the ring. Simultaneously, with transmitting the station monitors the ring and if a token sequence is observed on the incoming line into the station the token is tested to see the level of its priority. If the priority level is less than or equal to the priority of the message which is being transmitted, the station seizes the token and continues transmitting until its message buffer is empty. The station then generates a free token and sends it onto the line.

If the priority of the token is higher than the priority of the message being transmitted, the station aborts the transmission of the message, generates an abort pattern, sends it on the line and then sends the high priority token.

Still referring to FIG. 2, the ring adapter includes a front end section hereinafter called ring attached function (RAF) means 30. This is a grouping of electronic circuitry which performs electrical signal conversion on data which is slated for transmission onto the ring and on data which is received from the ring. Such signal conversions may include modulation and demodulation. Data into RAF 30 is supplied on serial ring in-line 32. Serial ring in-line 32 may be twisted pair conductors, fiber optics links, etc. Similarly, data to be inserted onto the ring is transmitted on serial ring out-line 34. Serial ring out-line 34 may be the same type of conductor as serial ring in-line 32. In addition, the ring attachment function means 30 extracts timing signal from the serial ring data and uses the timing signal for synchronizing the data onto serial ring out-line 34 and into the ring protocol management (RPM) means 36. The RAF also includes the transmitters and receivers which transmit and receive information from the communication ring.

Ring attachment function means 30 is coupled to the ring protocol management means 36 by the ring protocol management/ring attachment function (RPM/RAF) interface. The function of the RPM/RAF interface is to transmit data between the ring protocol management means 36 and the ring attachment function 30. The function which the lines in the interface perform is self-explanatory from the names assigned to each of the lines. For example, serial data which is received on serial ring in line 32 is transmitted as serial received data on conductor 38 to the ring protocol management means 36. Likewise, clock 40 is a timing signal (derived from serial ring data) and is used to synchronize serial data to transfer at the RPM-RAF and serial ring-out interfaces. Likewise, serial transmit (XMIT) data line 42 transmits data signals which are to be synchronized and placed on the transmission ring.

Still referring to FIG. 2, ring protocol management means 36 is a grouping of digital circuitry that performs a bit and a byte level function. These functions include encoding and decoding data, handling of the protocols, generating and detecting delimiters, generating and checking cyclic redundancy check (CRC), decoding addresses, etc. When the ring protocol management means 36 is not in a transmit sequence, it repeats serial received data as serial transmit data. When given a formatted message frame in the random access memory 44 and a command to transmit, ring protocol management means 36 monitors the serial ring data for the proper access method sequence which indicates permission to transmit. As described above, either the token sequence or the Secondary Transmit Opportunity sequence can be used to gain access to the ring. The token sequence protocol is fully described in the above-described publication and can be referred to for a detailed description of its operation. The STO protocol which is the basis of the invention will be described subsequently.

Once a free token or an STO protocol transmission is given, the ring protocol management means 36 inserts the frame in the serial ring-out data stream. In addition, the ring protocol management means 36, generates new token sequences to go on the ring, copies messages which are transmitted to the station, and performs stripping functions upon messages that were originated by the station after these messages traverse the ring.

The ring protocol management means 36 is coupled over RPM/RAM interface 48 and CP/RPM interface 50 to RAM 44 and control processor 52, respectively. Conductors 54 and 56 convey data to and from RAM 44 into the ring protocol management means 36. Control information such as read/write signals, address and timing signals are carried on control and address (control ADDR) line 58 to RAM 44. In the CP/RPM interface 50 clocking information is transmitted on clock line 60 while status information and control information are conducted on conductors 46 and 62, respectively. A more detailed description of the ring adapter is given in application Ser. No. 463,470, entitled "Protocol for Determining Physical Order of Active Stations on a Token Ring" filed Feb. 3, 1983, by E. L. Tucker et al and assigned to the assignee of the present invention. The contents of that application are incorporated herein by reference.

Figure 3:
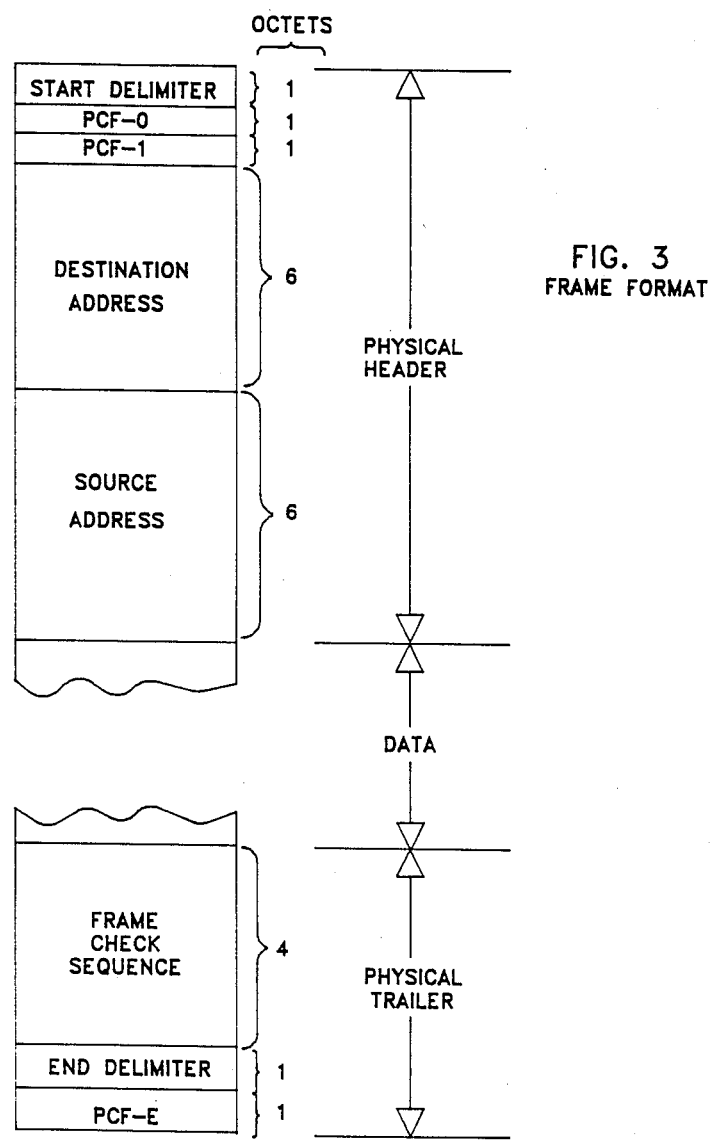
FIG. 3 shows a schematic for the frame format.

FIG. 3 shows the frame format for the messages which are generated and transmitted by a station onto the communication link of FIG. 1. This frame is identical with the message format which is defined by the above referenced IEEE 802 standards. Essentially, the message comprises of a start delimiter field, a PCF-0 field, a PCF-1 field, a destination address field, a source address field, a data field, a frame check sequence field, end delimiter field, and a PCF-E field. The start delimiter, PCF-0, PCF-1, destination address, and source address field are referred to as the physical header. Similarly, the frame check sequence field, end delimiter field and PCF-E field are referred to as the physical trailer. As will be explained hereinafter, an electrical circuitry is positioned in the ring protocol management section of the ring adapter to monitor for the respective message fields and based on the presence or absence of the field, enable a station to access the ring. The number of bytes or octets which are allotted to each field are shown in FIG. 3. For example, the start delimiter field has one octet and so forth.

Figure 4:
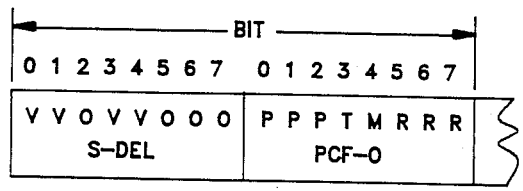
FIG. 4 shows a schematic for the start of frame sequence format.

FIG. 4 shows a format for the start of frame sequence. The start of frame sequence consists of two bytes or octets. Each octet consists of eight bits. The first octet is the start delimiter (S-DEL) octet. The second octet is a physical control field (PCF)-0. The values and/or interpretation which are assigned to the characters in each bit position are fully described in the above referenced IEEE 802 publication. Of primary interest is the T bit in the second octet. This bit is called the token indication bit. When it is set to 1, it indicates a start of frame sequence and is followed by the rest of the message as shown in the frame format. When T is set to 0, it indicates the first two octets of a free token which may be seized by a station and used to transmit its data onto the ring. The "R" bits are reservation bits which may be used by any station to reserve a priority.

Figure 5:
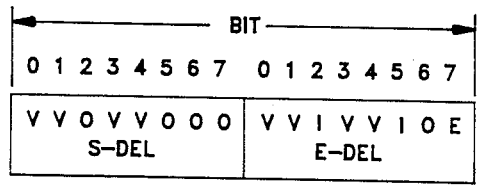
FIG. 5 shows a schematic for the abort sequence format.

FIG. 5 shows a format for the abort sequence. The abort sequence is generated when a station which gains access to the ring via the STO protocol aborts its transmission. The abort sequence protocol comprises two octets, a start delimiter (S-DEL) octet and an end delimiter (E-DEL) octet. The "V" represents Manchester code violation. The "0" and "1" represent bits. "E" represents error bit.

Figure 6:
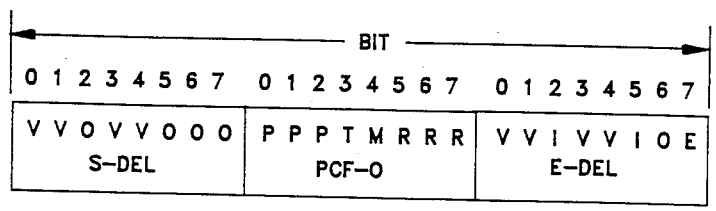
FIG. 6 shows a schematic for the prior art free token sequence format.

FIG. 6 shows the format of the free token sequence. As described above, this is a prior art access protocol and is incorporated to the extent that it impacts the new protocol of the present invention. The token protocol consists of a start delimiter (S-DEL) octet, a physical control field-0 (PCF) octet and an end delimiter (E-DEL) octet. The symbols which are recorded in the various bit positions of the protocol are interpreted as follows:

V represents Manchester code violation.
P represents access priority field.
T represents token indication bit. This bit is set to "0" for a free token.
M represents monitor count bit.
R represents access reservation field.
E represents error bit.

The use of each of these fields is fully described in the above referenced publication and can be referred to if need be.

Figure 7:
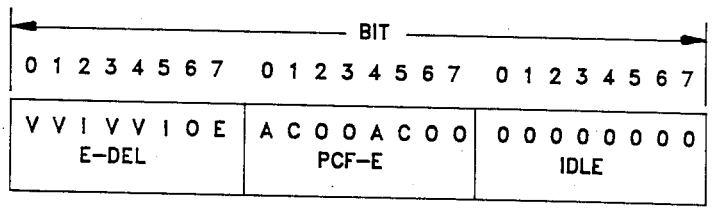
FIG. 7 shows a schematic of a format for the secondary transmit opportunity sequence protocol according to the teaching of the present invention. The protocol gives stations the additional opportunity to transmit on the ring.

FIG. 7 shows the format of the Secondary Transmit Opportunity sequence according to the teaching of the present invention. The sequence comprises of three octets identified as end delimiter (E-DEL), physical control field-end (PCF-E) and idle. The idle octet contains no Manchester code violations and typically may be all 0 bits or all 1's. The E delimiter (E-DEL) octet is identical to the previously E delimiter octet of the token protocol described with reference to FIG. 6. The "A" of the PCF-E octet represents "Address Recognized" while the "C" represents "Frame Copied." It should be noted that once a station observes a bit pattern on its incoming ring, substantially identical to the format shown and described in FIG. 7, an opportunity for transmitting via the Secondary Transmit Opportunity protocol is presented. A station may seize this secondary opportunity and transmit its data onto the ring. Having described the format for messages and protocol that controls a serial ring, the circuit which is used to generate the novel access method protocol will now be described.

Figure 8:
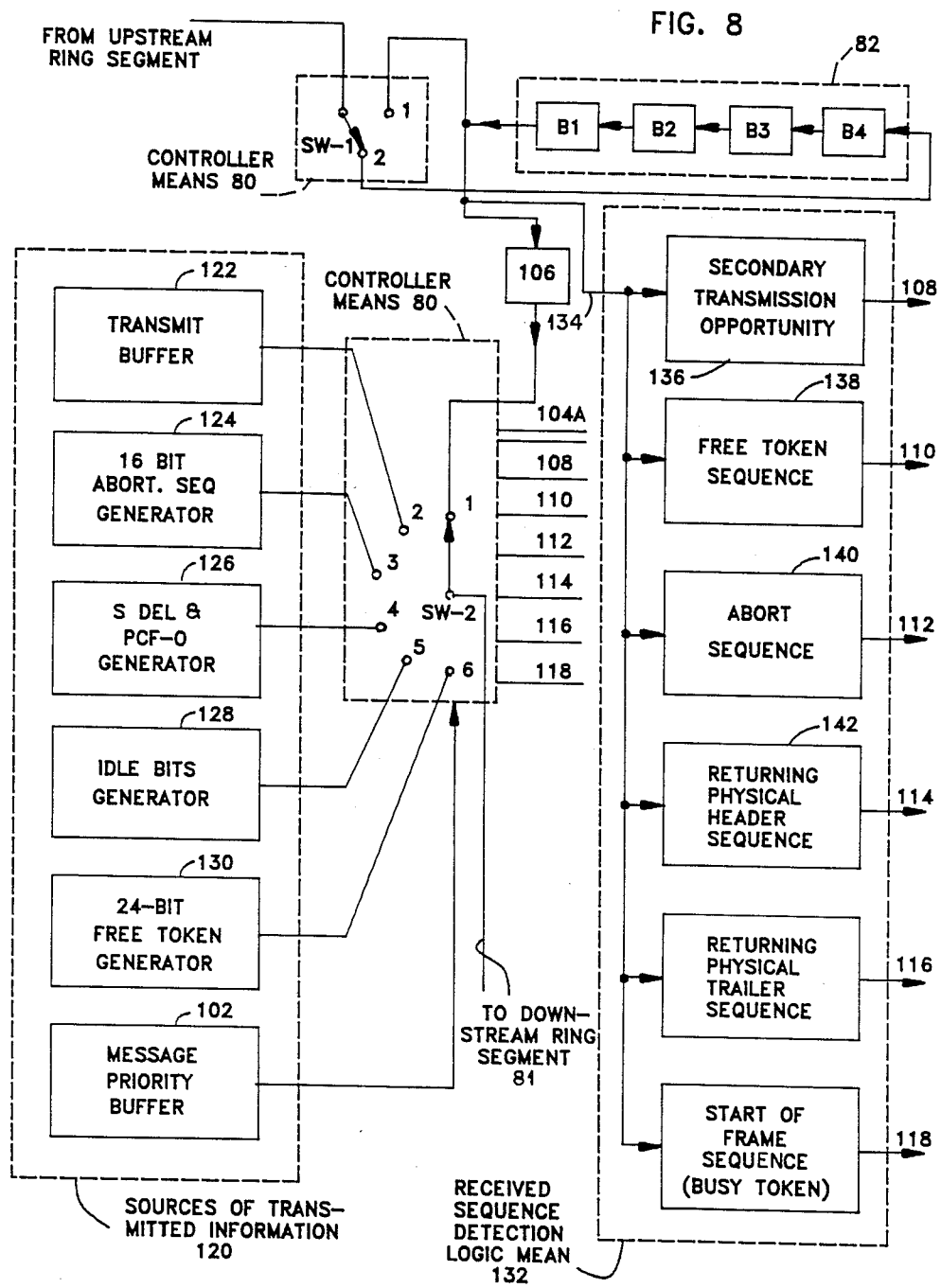
FIG. 8 shows a block diagram of the accessing circuitry according to the teaching of the present invention.

FIG. 8 shows a block diagram of the access circuitry according to the teachings of the present invention. The circuit is located in the ring protocol management section 36 of each of the ring adapters (FIGS. 1 and 2). The access circuitry includes a controller means identified by numeral 80. The function of controller means 80 is to position SW-1 and SW-2. Preferably, controller means 80 is a microprocessor controlled multiplexor switching means. Of course, it is within the skill of the art to generate the switching function utilizing combinatorial logic elements. Control delay means 82 is connected by a conductor to terminal 2 of switch 1 (SW-1). As will be explained subsequently, control delay means 82 is inserted to buffer incoming signals when a station is transmitting under the control of the Secondary Transmit Opportunity (STO) protocol of the present invention.

With reference to FIG. 3, the control delay means 82 comprises of a plurality of data buffers connected in series and identified by B1, B2, B3 and B4. Preferably, each of the buffers stores 16 half-bits. It should be noted that two half bits occupy the same duration as one data bit. The coding of two half bits a logical 1 or 0 or can represent a code violation. As will be explained subsequently, when switch 1 is coupled to terminal 1 (FIG. 8), the four buffers each are preset to contain an idle octet. As stated before, the idle octet may be all 1's or all 0's. The output from each of the buffers is fed over conductors into compare circuits identified in FIG. 9 by numerals 84, 86, 88 and 90. The comparators are utilized to generate the control signal on conductors 92, 94, 96 and 98 when an idle bit pattern is present on the buffers. For example, comparator circuit 84 generates an output pulse on conductor 92 when it detects an idle octet. Compare circuit 86 generates a control signal on conductor 94 when it detects an idle octet in buffer B3. Similarly, comparator circuits 88 and 90 output control signals on conductors 96 and 98 when an idle octet is detected in B1 or B2 buffer.

Figure 9:
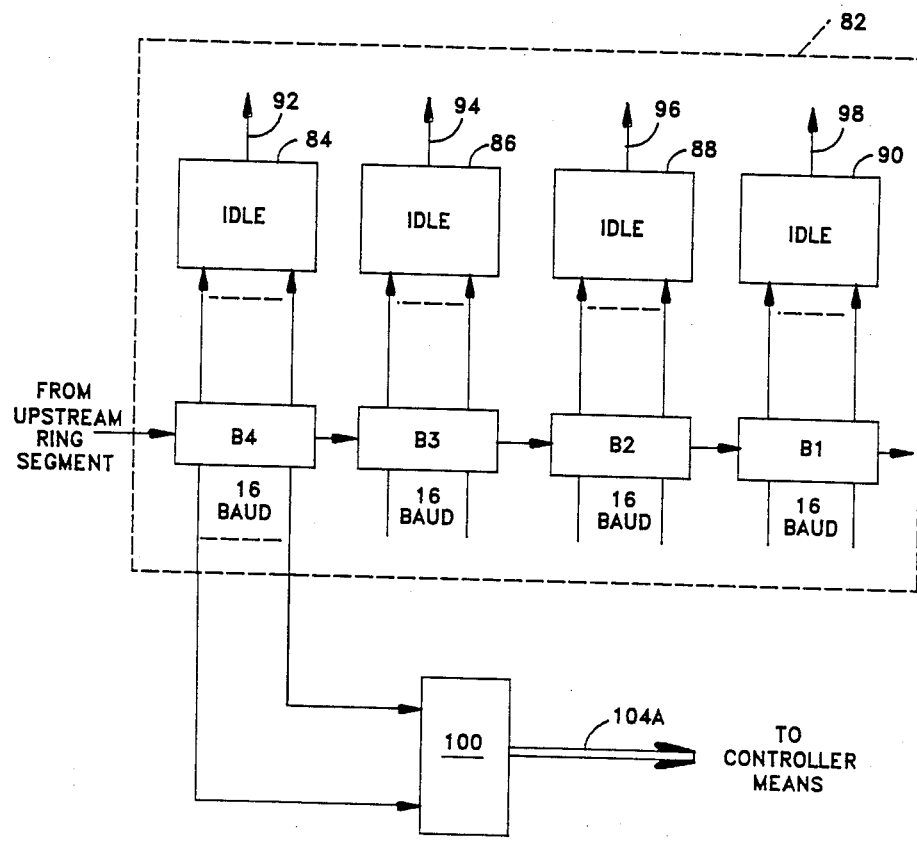
FIG. 9 shows a more detailed block diagram of a circuitry that monitors the input line into a station when the station utilizes the protocol of FIG. 7.

Referring to FIG. 9, the octet in buffer B4 is fed over conductors into an 8-bit register identified by numeral 100. The octet which is trapped in register 100 is the PCF-0 octet of an incoming token sequence. This octet is buffered so that the controller can compare the priority of the token sequence with the priority of the message stored in message priority buffer 102 (FIG. 8). Depending on the outcome of the comparison, the station either aborts the transmission of the local generated message and forwards the token sequence, or else completes the transmission of the local generated message and then forwards the token. The output from register 100 is fed over multiplexor bus 104A to the controller means.

Still referring to FIG. 8, the output from control delay means 82 is connected to conductor 104. Conductor 104 is connected through a one-bit delay identified by numeral 106 to controller means 80. One of the functions of controller means 80 is to monitor the control pulses which are outputted on conductors 108-118 and position switch-2 to one of the terminals identified by 1-6. Terminals 2-6 are tied by individual conductors to the sources of transmitted information means 120. The function of the sources of information transmitted means 120 is to generate the information which is to be transmitted on the ring. To this end, the sources of information transmitted means included a plurality of generators, each of which generates a unique bit pattern which is to be transmitted. For example, transmit buffer 122 stored the information which is to be transmitted from the station onto the ring. Generator 124 generates the 16-bit abort sequence. Block 126 generates the S-DEL and PCF-0 octet. Generator 128 generates the idle bits and generator 130 generates the 24-bit free token. The pattern of the bits for each of the generators is previously described.

Still referring to FIG. 8, the control signals on terminals 108-118 are generated from the receive sequence detection logic means 132. The receive sequence detection logic means 132 comprises of a plurality of monitoring circuits which monitor the incoming message to detect certain bit patterns on the line. The receive sequence detection logic means 132 is connected by conductor 134 to conductor 104. Each of the blocks which makes up the received sequence detection logic means 132 monitors for a different bit pattern on the incoming line. When the preassigned bit pattern is detected, a control pulse is outputted on the respective outputs.

To this end block 136 monitors the line to detect the secondary transmission opportunity pattern. Block 138 monitors the line to detect the free token sequence pattern. Block 140 monitors the line to detect an abort sequence pattern. Block 142 monitors the line to detect a returning physical header sequence pattern. Block 144 monitors the line to detect a returning physical trailer sequence pattern. Block 146 monitors the line to detect a start of frame sequence pattern. This pattern also includes a token bit. The blocks in the receive sequence detection logic means 132 are arranged in parallel. This arrangement tends to improve the response time for the various detector circuits. Each of the patterns which is detected by the receive sequence detection logic means 132 has been previously described. It should be noted that it is well within the skill of one skilled in the art to generate the appropriate circuits so that the blocks can detect the assigned pattern. As such the detailed implementation of all the blocks will not be given.

FIGS. 10, 10A, 11, 12 and 13 show detailed logic for obtaining control signals on conductors 108, 110, 112 and 118 (FIG. 8).

Figures 10, 10A:
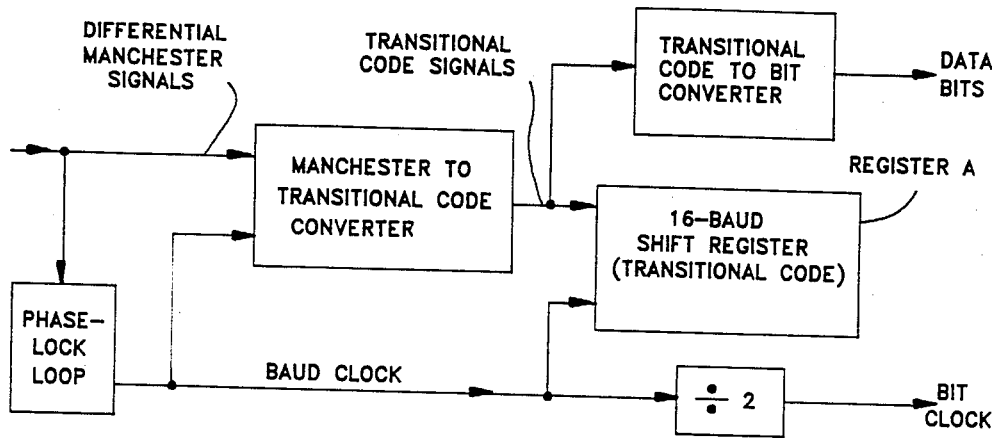
FIG. 10 shows elements for converting Manchester code to transitional code, and to binary data bits.
FIG. 10A shows a table which gives the relationship between Manchester code and an output transitional code.

FIG. 10 is a block diagram of a circuit for converting differential Manchester encoded signals, which arrive from the upstream ring segment, into transitional encoded bauds. The stream of transitional encoded information is inserted into a 16-baud (bit) shift register (Register A), and is also decoded into a stream of binary "Data Bits." Also shown in FIG. 10 is a phase-locked loop means that develops a "baud clock." This clock is synchronized to the transitions in the incoming Manchester encoded baud stream. Finally, a "bit clock" is obtained by dividing the "baud clock" frequency by 2. The "bit clock" is used for serializing the flow of data bits.

FIG. 10A shows a table that equates the input differential Manchester baud sequence with the output transitional code.

Figure 11:
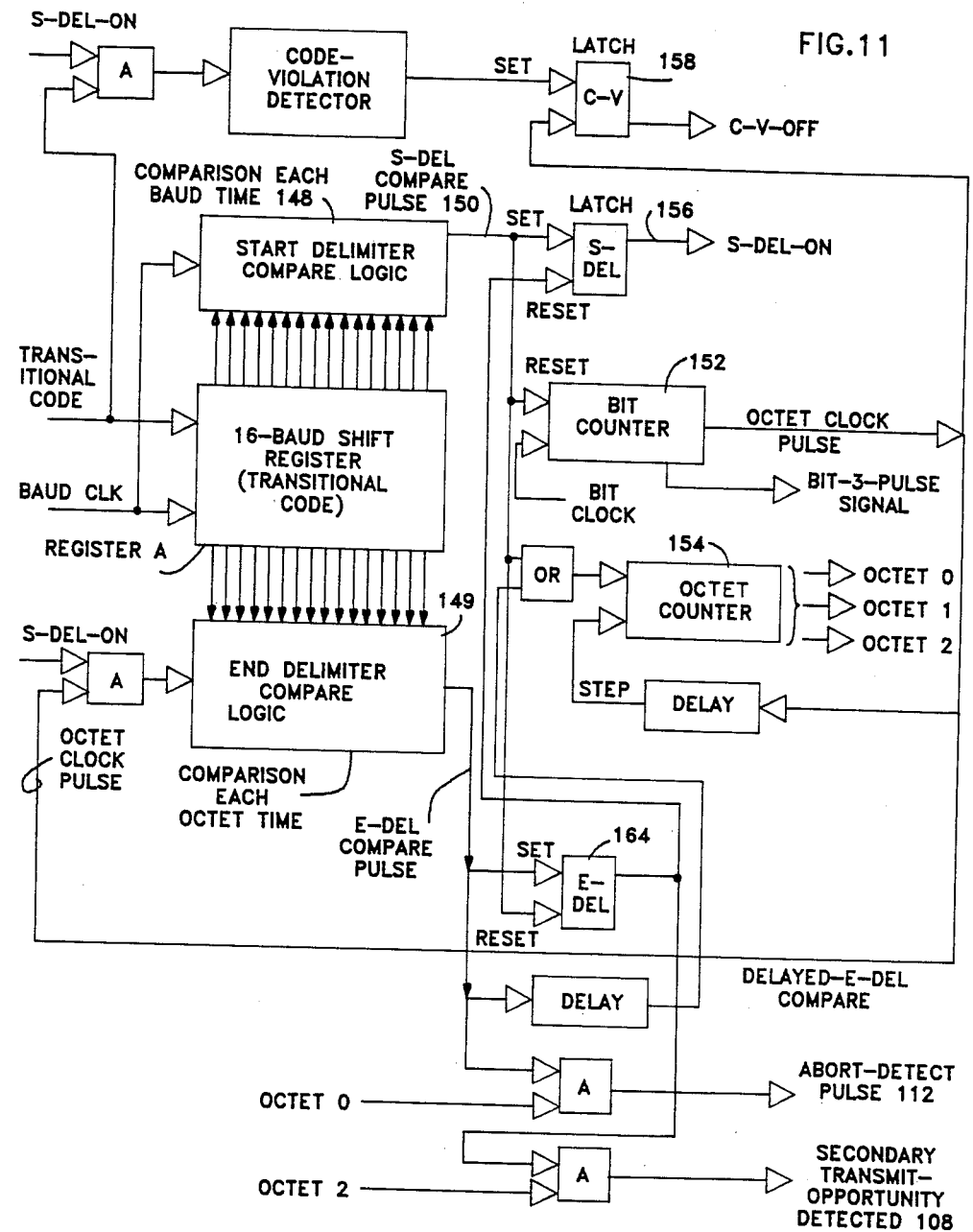
FIG. 11 shows a circuit for generating an abort detected pulse and a secondary transmit opportunity.
Figure 12:
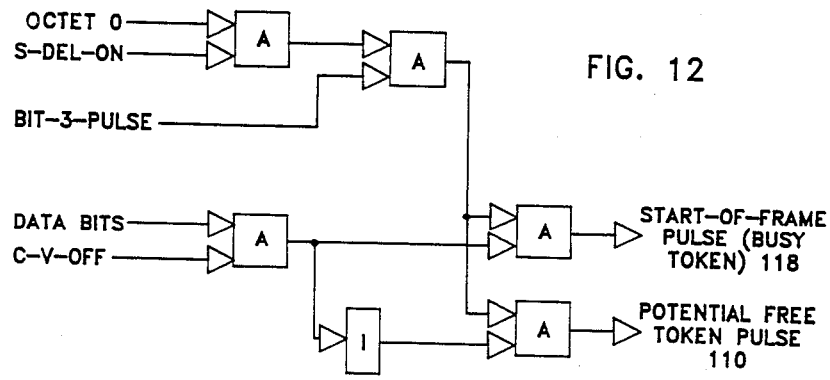
FIG. 12 shows circuitry for generating a start of frame pulse and a potential free token pulse.

FIG. 11 shows Register A, together with two associated comparison elements identified by numerals 148 and 149. Comparison element 148 (labeled "Start Delimiter Compare Logic") compares the contents of Register A with the transitional code baud pattern for a Start Delimiter. This comparison is made each time a new baud is shifted into Register A. If a match is detected, an S_DEL_COMPARE pulse is generated on conductor 150.

The S_DEL_COMPARE pulse resets the bit counter 152 and the octet counter 154. In addition, the pulse sets the S_DEL_LATCH 156 to the ON state (causing the S_DEL_ON signal to become active).

Bit Counter 152 is a (0-7) bit counter that is stepped by the "bit clock." This counter counts the bit positions in the data octets that are received from the upstream ring segment. Whenever the bit counter cycles from the 7-state to the 0-state, an "octet clock" pulse is generated. Whenever the 4th bit of an octet is being received, the counter activates the bit 3 pulse signal.

Octet counter 154 is a relatively large counter (e.g., 0–1023 bits) that is stepped by a delayed pulse derived from the "octet clock." The octet counter counts the number of octets that follow a start delimiter, with the first of these octets corresponding to the 0-count, the second of these octets corresponding to the 1-count and so forth. Thus, when the PCF-0 octet is received, the octet counter should be in the 0-count state.

FIG. 11 also shows code violation detection logic elements that examine the stream of transitional encoded bauds, while the S-DEL on signal is active, and set the C-V latch to the on state if a code violation is detected. If the C-V latch is off when the bit 3 pulse signal of PCF-0 is present, then the combinatorial logic shown in FIG. 12 will cause either a start of frame pulse 118 (FIG. 8) or a potential free token pulse 110 (FIG. 8) to be generated, depending on the state of the PCF-0 token indicator bit. The signals that are used to develop pulses 118 and 110 are clearly marked on FIG. 12.

Still referring to FIG. 11, the contents of Register A are examined after each octet is received, and compared against the transitional code pattern for an end delimiter by end delimiter compare logic 149. If a match is found, the E-DEL compare pulse is generated. This pulse causes the E-DEL latch 164 to be set after a short delay (approximately 2-bits) causes the octet counter 154 to be reset. The setting of the E-DEL latch activates the E-DEL on signal, and this signal then resets the S-DEL latch.

If the E-DEL compare pulse occurs while the octet counter is in the 0-count state (the octet 0 signal is active), then an abort sequence has been detected, and the abort detect pulse signal is generated on conductor 112 (FIG. 8).

If the octet counter reaches the 2-count state (the octet 2 signal is active) while the E-DEL latch is on, then a Secondary Transmit Opportunity (STO) signal is activated on conductor 108 (FIG. 8).

Figure 13:
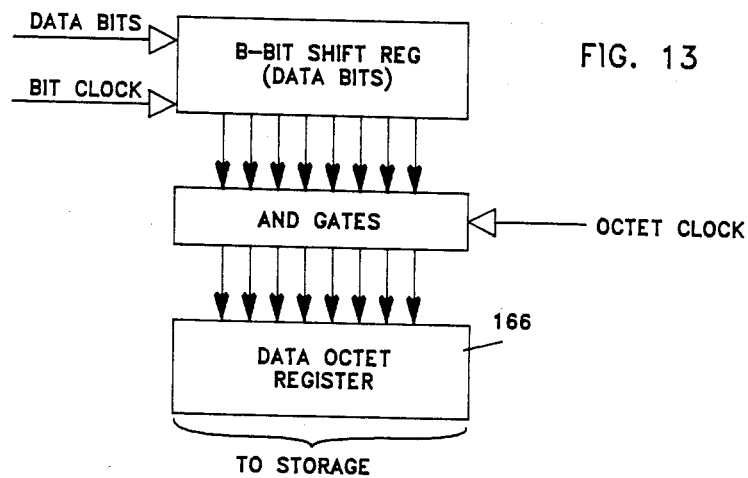
FIG. 13 shows a block diagram for deserializing the data bits.

FIG. 13 shows how the data bits are deserialized into octets, and then loaded into the data octet register 166. This register buffers the octet until it can be transferred into storage.

OPERATION

When the station has no information buffered in its transmit buffer 122 (FIG. 8), the controller means 80 sets switch 1 to position 1 and switch 2 to position 1. Information received from the upstream ring segment is retransmitted to the downstream ring segment. The 1 bit delay generated by delay means 106 is inserted into the ring and allows time for a station to regenerate the signal. It should be noted that when the switches are configured in this position the station is in the repeat mode. It should also be noted that when switch 1 is set at position 1 the four buffers B1–B4 each is preset with idle octets. As stated before, the idle octet may all be logical 1's or 0's.

A station which has a message ready to be transmitted will buffer this message in the transmit buffer 122. The priority associated with this message is also stored in message priority buffer 102. The station now waits for the arrival of one of the two possible types of transmit opportunities, namely, a free token or Secondary Transmit Opportunity (STO). If a free token opportunity is received from an upstream station, it is detected by detector 138. The station seizes the token, makes it busy, and then transmits the buffered message. When a message is transmitted, using the free token protocol, SW-2, FIG. 8, is set to position 2 and SW-1 is set to position 1.

If the other type of transmit opportunity, that is, the Secondary Transmit Opportunity, arrives, it is detected by detector 136. The detector outputs a controlled pulse on conductor 108 which informs the control means 80 of the type of opportunity. If this type of transmit opportunity is detected before a free token is recognized, the controller moves SW-2 to position 4 and starts to send a 2-octet sequence consisting of a start delimiter (S DEL) followed by a PCF-0 octet. The three priority bits of the PCF-0 octet are encoded with a lowest priority code. The TI bit is set to 1. The remaining bits of the PCF-0 octet are set to 0's. When SW-2 is set to position 4, SW-1 is set to position 2.

After the start delimiter and PCF-0 octets have been sent, the station moves SW-2 to position 2, and begins to transmit the buffered message. While the message is being transmitted, a copy is retained in the transmit buffer to permit possible retransmission.

While a station is transmitting a message based on the STO protocol, signals received from the upstream segment are diverted to flow through the buffers B4, B3, B2 and B1. The contents of these buffers are examined by the compare circuits (FIG. 9). The compare circuits can recognize the presence of idle patterns in the buffers.

When a station is transmitting under the aegis of the STO protocol, if a token of higher priority is received, it must abort transmission and pass on the token. Therefore, there are three situations to be considered when the station begins to transmit after recognizing an STO pattern. The conditions are:

Condition A—no start of frame pulse appears on conductor 118 during the transmission of the message.

Condition B—a potential-free-token pulse appears on conductor 110 during the transmission of the message.

Condition C—a start of frame pulse appears on conductor 118 during the transmission of the message.

If condition A above exists, the station completes the transmission of the message stored in its transmit buffer. No token has been received from the upstream ring segment during this transmission period. SW-2 (FIG. 8) is moved to position 1 and the station begins to retransmit the signals received from the upstream ring segment. The station is essentially in repeat mode. The station is responsible for stripping the message which it has sent and is also responsible for de-inserting buffers B1–B4.

If condition B above is present, a token is detected by a station which has begun to transmit using an STO transmit protocol. The station compares the priority code of the received free token with the access priority of the message which is currently being transmitting. There are two sub-conditions which may exist.

Sub-condition A: If the access priority of the transmitted message is equal to, or higher than, the priority of the received free token, the station continues to transmit the message while buffering in a register the PCF-0 octet of the received token. When the station has completed the transmission of the message, it sets switch SW-2 to position 6, and transmits a free token containing a PCF-0 octet with identical characteristics as that of the previously-received free token. After sending the free token, switch SW-2 is moved to position 1. Switch SW-1 remains in position 2.

Sub-condition B: If the access priority of the transmitted message is less than that of the received free token, the station sets switch SW-2 to position 3, and sends the two-octet abort sequence. At the end of this transmission, the start delimiter of the free token has moved into buffer B1 (FIG. 9). Switch SW-2 is now set to position 1, and the free token is retransmitted on the downstream ring segment. The station waits for a new transmit opportunity for resending its aborted message.

If condition C above exists, a start of frame sequence is received from the upstream ring segment. The station sets switch SW-2 to position 3, and sends the two octet abort sequence. It should be noted that at the end of this transmission, the start delimiter of the start of frame sequence is moved into buffer B1. Switch SW-2 is now set to position 1 and the frame from the upstream ring segment is retransmitted. The station waits for a new transmit opportunity for resending its aborted message.

A station which has SW-1 set to position 2 examines the signals received from the upstream ring segment until it recognizes a 3-octet free token sequence. Once this sequence is recognized, buffers B4, B3, B2 and B1 should each contain 8 idle bits. When this condition is recognized, the SW-1 is set to position 1.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. A method for operating stations on a ring network comprising the steps of:
   (a) monitoring an input terminal at each of said stations to detect a first predetermined bit pattern on the ring network;
   (b) inserting, from one of the stations, message characters onto the ring network in place of a portion of said first predetermined bit pattern;
   (c) monitoring the input at said one station to detect a second predetermined bit pattern from any station other than said one station;
   (d) buffering at said one station a portion of the second predetermined bit pattern;
   (e) determining a relative priority between the received second predetermined bit pattern and the message characters being transmitted; and
   (f) aborting transmission of the message character and forwarding the second predetermined bit pattern only if the relative priority has a predetermined relationship.

2. The method recited in claim 1 wherein the relative priority of the second predetermined bit pattern and transmitted message are being determined by comparing a selected portion of the second predetermined bit pattern with the priority status of the message characters being transmitted.

3. The method recited in claim 1 wherein transmission of the message characters is aborted only if the priority of the received second predetermined bit pattern is higher than the priority of the message characters being transmitted.

4. The method recited in claim 1 wherein the first predetermined bit pattern includes an idle octet.

5. The method recited in claim 1 wherein the second predetermined determined bit pattern includes a start of message character sequence.

6. An apparatus for allowing stations to access the ring of a communication network system, said apparatus comprising:
   means for monitoring an input at each of said stations to detect a first predetermined bit pattern;
   means, provided at a transmitting station, for inserting message characters into the communication network system following detection of said first predetermined bit pattern;
   means for monitoring the input at the transmitting station to detect a second predetermined bit pattern being transmitted from any station other than the transmitting station;
   means in the transmitting station for buffering a portion of the second predetermined bit pattern;
   means in the transmitting station for determining a relative transmission priority between the second predetermined bit pattern and the message characters; and
   means in the transmitting station for aborting the message characters being transmitted and forwarding a received message only if the relative priority has a predetermined relationship.

7. A method of operating the stations on a token ring network comprising the steps of:
   monitoring an input at said stations to detect incoming idle characters;
   inserting message characters from a transmitting station onto the token ring network in place of said incoming idle characters,
   monitoring the input at the transmitting station to detect an incoming token protocol from any station other than the transmitting station;
   buffering a fixed portion of the incoming token protocol at the transmitting station,
   comparing a selected portion of the incoming token protocol with a priority status being assigned to the transmitting station to determine a relative priority between the incoming token protocol and message characters being transmitted, and
   aborting transmission of the message characters and forwarding the incoming token protocol only if the relative priority has a predetermined relationship.

8. A device for giving stations access to transmit data on a token ring network comprising:
   means provided at each station for monitoring an input line to detect idle characters thereon;
   means provided in a transmitting station for inserting message characters onto the token ring network in place of said idle characters;
   means for monitoring the input at the transmitting station to detect a predetermined token sequence from any station other than the transmitting station;
   means provided at the transmitting station for buffering a fixed portion of the predetermined token sequence;
   means for comparing a selected portion of the predetermined token sequence with a priority status for the transmitting station to determine a relative priority between the predetermined token sequence and the message characters being inserted; and
   means for aborting transmission of the message characters and forwarding the token sequence only if the relative priority has a predetermined relationship.

9. An apparatus for controlling the stations of a ring communication network comprising:
   means operable for monitoring the ring and for generating a control signal when a predetermined bit pattern is being detected;
   means responsive to the control signal and operable to initiate transmission of a locally generated message;
   means operable for monitoring the ring and for generating a second control signal when a second predetermined bit pattern is being detected;
   means operable for determining a relative transmission priority between the locally generated message and the second predetermined bit pattern; and
   means for aborting transmission of the locally generated message only if the relative transmission priority has a predetermined relationship.

10. A device for giving stations access to a token ring network comprising:
    means for monitoring an input at each of said stations to detect an idle line condition;
    means for inserting a local message onto the token ring network following a detection of the idle line condition;
    means for monitoring the input at a transmitting station to detect a start of message character sequence from any station other than the transmitting station; and
    means for aborting transmission of the local message and forwarding the start of message character sequence.

11. A method of operating the stations on a token ring network comprising the steps of:
    monitoring an input at each said station to detect an idle line condition;
    inserting local message characters onto the token ring network following a detection of the idle line condition;
    monitoring the input at a transmitting station to detect a predetermined message sequence from any station other than the transmitting station; and
    aborting transmission of the local message characters and forwarding the predetermined message sequence.

12. The method of claim 11 wherein the predetermined message sequence is being forwarded only if said predetermined message sequence includes a start of message character sequence.

* * * * *